(No Model.)
T. A. MARTEENY.
SKATING CYCLE.
No. 573,096. Patented Dec. 15, 1896.
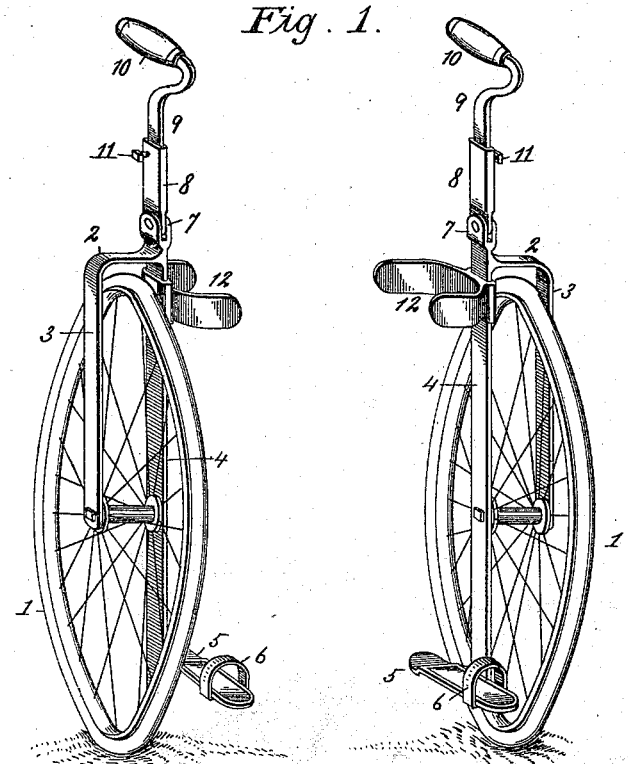
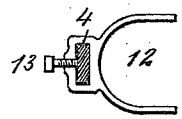
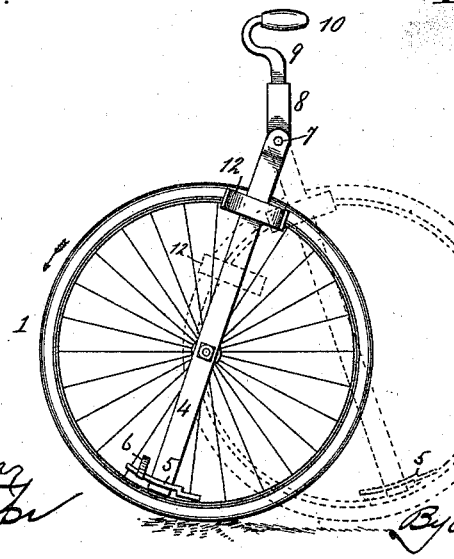
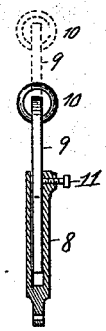
Witnesses:
F. G. Fischer
G. P. Thorpe
Inventor
T. A. Marteeny,
By Higdon & Higdon
Attys.
THE NORRIS PETERS CO., PHOTO-LITHO., WASHINGTON, D. C.

UNITED STATES PATENT OFFICE.

TILLMAN A. MARTEENY, OF KANSAS CITY, MISSOURI.

SKATING-CYCLE.

SPECIFICATION forming part of Letters Patent No. 573,096, dated December 15, 1896.

Application filed August 25, 1896. Serial No. 603,913. (No model.)

*To all whom it may concern:*

Be it known that I, TILLMAN A. MARTEENY, of Kansas City, Jackson county, Missouri, have invented certain new and useful Improvements in Walking or Skating Cycles, of which the following is a full, clear, and exact description, reference being had to the accompanying drawings, forming a part thereof.

My invention relates to walking or skating cycles; and my object is to produce a vehicle of this character which may be used with much less exertion than a bicycle or tricycle and by which one may, with less exertion, travel several times as fast as when walking.

A further object of the invention is to produce a vehicle of this character which may be manufactured and sold much cheaper than a bicycle, and which possesses great advantages over the latter in that the rider maintains a perfectly erect and healthful position and uses practically the same muscles as are employed in walking.

With these general objects in view the invention consists in certain novel and peculiar features of construction and combinations of parts, as will be hereinafter described and claimed.

In order that the invention may be fully understood, I will proceed to describe it with reference to the accompanying drawings, in which—

Figure 1 represents a perspective view of a walking or skating cycle embodying my invention. Fig. 2 represents a side elevation of the same and discloses the varying positions it occupies in operation. Fig. 3 is a horizontal section to disclose more clearly the adjustable leg-clasp of the vehicle. Fig. 4 is a vertical section disclosing the adjustable handle-bar construction. Fig. 5 is a horizontal section to show the foot-plate.

Before proceeding with the detail description of the invention I wish to state that two of these cycles comprise a set, and that as they are precisely the same in construction, except that one is to embrace and support the left leg, while the other is to embrace and support the right leg of the rider, the description of one will suffice for both.

Referring now to said drawings, 1 designates a wheel, preferably of the pneumatic type, and from two to two and one-half feet in diameter.

2 designates an arch or inverted-U shaped bracket. Said arch embraces the outer sides of the hub of said wheel, and has the lower end of its outer arm 3 pivotally mounted upon the axle of said wheel. The inner arm 4 is also pivotally mounted upon the axle of said wheel, but exceeds in length the arm 3, and it is extended downwardly within a short distance of the surface upon which the wheel rests.

In practice the connection between said arched bracket or yoke and the wheel will be a ball-bearing connection, so as to reduce friction to the minimum, or a cone-bearing connection may be employed for a cheaper grade of cycle. To the lower end of the arm 4 is bolted or otherwise rigidly secured a foot-plate 5, which preferably is arranged at an angle to the direction in which the wheel travels. In other words, the foot-plate will be arranged to accommodate the natural position of the foot, which is with the toes turned outward.

Pivoted, as at 7, or united by means of a ball-bearing connection to the upper end of the arched bracket or yoke, to operate in a plane parallel to the wheel or direction of travel, is the lower end of a sleeve 8, and embraced snugly by said sleeve is a handle-bar 9, of any suitable form, provided at its upper end with a handle 10 of the type shown or any other suitable or preferred construction. By this arrangement the distance between the handle and the pivotal point 7 may be increased or diminished to accommodate persons of varying height, and said handle-bar is fixed at any desired point of adjustment by means of the set-screw 11, carried by the sleeve 8 and impinging upon the bar 9, or by an equivalent device.

12 designates a U-shaped clasp, which is disposed inwardly from the wheel and is located vertically over the foot-plate 5. It is slidingly mounted upon the arm 4 of the arch or yoke-frame above the axle of the wheel, and may be fixed at any required point thereon by means of the set-screw 13 or its equivalent. This clasp is adapted to engage the limb of the rider just below the knee, and in order that friction may not abrade or injure the limb in any way I contemplate providing the said clasp with a lining of leather or equivalent material.

In practice, as hereinbefore stated, two of these cycles will be employed, one to support the right and the other the left side of the rider, and when mounted thereon the body will be perfectly erect, with the arms hanging straight down and grasping the handles 10. To propel the cycle, it is only necessary to alternately advance and withdraw or swing back and forth one's feet, which of course causes the wheels to rotate continuously in the direction indicated by the arrow, Fig. 2, at a speed proportionate to the power applied. Each cycle will also be provided with a brake of any suitable or preferred construction, but as I contemplate using the ordinary spoon-brake in common use I have not deemed it necessary or desirable to illustrate it in this connection.

It will be apparent from the foregoing that with a cycle of this construction it will require no particular effort in mounting or dismounting, and it is also obvious that it can be placed upon the market at a comparatively low figure. Furthermore, it will not be clumsy and awkward to handle, nor take up half as much room as an ordinary bicycle. It also possesses many other desirable features, one of which is that it can be so easily and conveniently taken upstairs.

It will be understood, of course, that various changes in the detail construction, form, and arrangement of the parts may be made without departing from the spirit and scope of my invention or sacrificing any of the advantages thereof.

Having thus described the invention, what I claim as new, and desire to secure by Letters Patent, is—

1. A walking or skating cycle, comprising a wheel, a frame pivotally mounted upon the axle of said wheel, and provided with a foot-plate and leg-clasp, and a handle-bar having a pivoted connection with said frame, substantially as described.

2. A walking or skating cycle, comprising a wheel, a frame pivotally mounted upon the axle of said wheel and provided with a foot-plate and a leg-clasp, and an extensible and contractible handle-bar, having a pivoted connection with said frame, substantially as described.

3. A walking or skating cycle, comprising a wheel, a frame pivotally mounted upon the axle of said wheel and provided with a foot-plate and an adjustable leg-clasp, and a handle-bar having a pivoted connection with said frame, substantially as described.

4. A walking or skating cycle, comprising a wheel, a frame pivotally mounted upon the axle of said wheel and provided with a foot-plate and an adjustable leg-clasp, and an extensible and contractible handle-bar having a pivoted connection with said frame, substantially as described.

5. A walking or skating cycle, comprising a wheel, an arched bracket or yoke pivotally mounted upon the axle of said wheel, having its inner arm extended downwardly and provided with a foot-plate, a leg-clasp adjustably mounted upon said inner arm above the axle of the wheel, a sleeve pivotally connected to said arched bracket or yoke, a handle-bar adjustably mounted in said sleeve, and provided with a handle or gripping-surface, all arranged substantially as herein shown and described.

In testimony whereof I affix my signature in presence of two witnesses.

TILLMAN A. MARTEENY.

Witnesses:
M. R. REMLEY,
G. Y. THORPE.